3,514,436
PROCESS FOR POLYMERIZING BUTADIENE
AND ISOPRENE WITH HALOARYLLITHIUM
INITIATOR
William J. Trepka and Richard J. Sonnenfeld, Bartlesville, Okla., assignors to Phillips Petroleum Company, a corporation of Delaware
No Drawing. Filed Jan. 23, 1968, Ser. No. 699,771
Int. Cl. C08d 3/06, 3/10; C08f 3/16
U.S. Cl. 260—94.2         2 Claims

ABSTRACT OF THE DISCLOSURE

Preparation of haloaryllithium initiators by reacting a dihalobenzene or dihalonaphthalene with an organolithium compound and elemental halogen or a mixed halogen compound in the presence of a non-aromatic hydrocarbon diluent, which initiators are useful for the polymerization of isoprene and/or butadiene to produce rubbery polymer.

BACKGROUND OF THE INVENTION

This invention relates to polymerization initiators and the polymerization of butadiene and/or isoprene using same. In another aspect, this invention relates to a process for polymerizing butadiene, isoprene and mixtures thereof by contacting same with certain haloaryllithium initiators used as polymerization initiators. In accordance with a further aspect, this invention relates to a process for the preparation of haloaryllithium initiators from dihalo aromatics and organolithium compounds in the presence of selected halogens and non-aromatic hydrocarbon diluent that are useful for the polymerization of butadiene and/or isoprene.

The production of monohaloaryllithium compounds such as 3-bromophenyllithium is described in U.S. 3,215,679, Trepka. While any type of hydrocarbon diluent can be utilized for the preparation of these compounds, non-aromatic diluents ordinarily have not been employed. When these organolithium compounds are prepared in a diluent such as cyclohexane or n-pentane and subsequently used as initiators for the polymerization of isoprene or butadiene, it has been found that the initiator level needs to be relatively high in order to get polymerization to occur.

In accordance with the invention, it has now been found that haloaryllithium initiators can be prepared in a non-aromatic hydrocarbon diluent to give initiator materials which have excellent activity for the polymerization of conjugated dienes such as butadiene and/or isoprene. Quite surprisingly, it has now been found that when these initiators are employed for the polymerization of isoprene and butadiene, much lower initiator levels can be used to give higher monomer conversion than have been found operable with the known prior art methods.

Accordingly, it is an object of this invention to provide a process for the polymerization of butadiene and/or isoprene.

It is yet another object of this invention to provide a process for producing haloaryllithium initiators useful for the polymerization of diene monomers for producing rubbery polymeric products having improved properties.

It is yet another object of this invention to provide an improved process for producing polymers of isoprene having a high percentage of cis-1,4 addition.

It is a still further object of this invention to provide a polymerization initiator which can be employed at lower initiator levels than with known prior art initiators.

Other aspects, objects, and the several advantages of this invention will be apparent to those skilled in the art from the description and the appended claims.

SUMMARY OF THE INVENTION

In accordance with the invention, a process is provided for the preparation of a polymerization initiator from dihaloaryl compounds and organolithium compounds by reacting same in the presence of selected free halogens or mixed halogen compounds and a non-aromatic hydrocarbon diluent.

It has been found quite unexpectedly that the polymerization initiators formed above can be used at extremely low initiator levels, i.e., less than 2.5 millimoles per 100 grams of monomer for polymerization of conjugated dienes such as butadiene and/or isoprene.

It has been further found that polymers formed from isoprene contacted with the initiator prepared according to the invention have a high percentage, generally in excess of 85 percent, and often up to 95 percent or more, of cis-1,4-addition.

DESCRIPTION OF PREFERRED EMBODIMENTS

The dihaloaryl compounds employed according to the invention are selected from 1,3-dihalobenzene or 1,3-dihalonaphthalene wherein the halogen is selected from bromine, chlorine, or iodine. Representative examples of suitable dihaloaryl compounds include 1,3-dibromobenzene, 1,3-dibromonaphthalene, 1,3-dichlorobenzene, 1,3-diiodonaphthalene, 3 - bromochlorobenzene, 3 - iodochlorobenzene, 3-iodobromobenzene, 1,3-diiodobenzene, 1-bromo-3-chloronaphthalene, 1-iodo-3-bromonaphthalene, and the like.

The organolithium compounds that can be employed have the general formula RLi, wherein R is an alkyl, cycloalkyl or aryl hydrocarbon radical, or combinations thereof, such as aralkyl, alkaryl, and the like, containing from 1 to 12 carbon atoms. Examples of such compounds are methyllithium, ethyllithium and n-butyllithium, phenyllithium, cyclohexyllithium, cyclopentyllithium, n - dodecyllithium, benzyllithium, 4 - phenylcyclohexyllithium, 4-cyclohexylphenyllithium, and the like.

The haloaryllithium initiators of the invention have the formula:

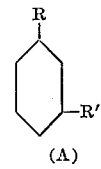

(A)

or

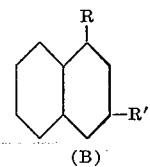

(B)

and mixtures of (A) and (B) wherein R and R' are selected from lithium and a halogen, said halogen being selected from bromine, chlorine and iodine, and one R or R' is halogen and the other is lithium.

Examples of haloaryllithium initiators of the above formulas include 3-bromophenyllithium, 3-chlorophenyllithium, 3-iodophenyllithium, 3-bromo-1-naphthyllithium, 3-chloro-1-naphthyllithium, 1-iodo - 3 - naphthyllithium, 1-bromo-3-naphthyllithium, and mixtures thereof.

The halogens or mixed halogen compounds that can be employed according to the invention include elemental chlorine, bromine, iodine, iodine monomchloride, iodine monobromide, and the like.

The non-aromatic hydrocarbon diluents employed for the preparation of the initiators of the invention are selected from paraffins and cycloparaffins containing from 4 to 10 carbon atoms per molecule, preferably 4 to 7 carbon atoms per molecule, such as butanes, pentanes, hexanes, heptanes, cyclopentane, methylcyclopentane, cyclohexane, methylcyclohexane, and the like.

The molar ratio of dihaloaryl compound employed for the initiator preparation to halogen or mixed halogen compound present will be in the range of 0.25:1 to 10:1.

The amount of organolithium employed for the initiator preparation is that which is sufficient to react with all the elemental halogen or mixed halogen compound with enough remaining to react with at least a portion of the 1,3-dihaloaryl compound to produce a haloaryllithium compound, as defined. It is not necessary that all the 1,3-dihaloaryl compound be converted to haloaryllithium. The molar ratio of organolithium to halogen or mixed halogen compound will be in excess of 1:1 and generally will range from 1.05:1 to 15:1, preferably 2:1 to 8:1.

The temperature employed for initiator preparation will ordinarily range from 32 to 212° F., preferably 86 to 158° F.

The initiator can be prepared and the subsequent polymerization carried out in an inert atmosphere in the presence or absence, preferably presence, of a substantially inert diluent. Suitable atmospheres include argon, helium, nitrogen, and the like. Suitable polymerization diluents include paraffins and cycloparaffins containing from 4 to 10 carbon atoms per molecule, inclusive, examples of which include cyclohexane, methylcyclohexane, n-butane, n-hexane, n-pentane, n-heptane, isooctane, mixtures thereof, and the like. Aromatic hydrocarbons such as benzene, toluene, xylene, and the like, can be used for polymerization but are not presently preferred. It is presently preferred to employ the same hydrocarbon diluent for initiator preparation as polymerization diluent. A higher cis- content of polymer is obtained when the polymerization is conducted in a non-aromatic diluent.

According to the invention, an amount of haloaryllithium prepared according to the invention effective to cause polymerization of isoprene and/or butadiene, which amount is less than 2.5 gram millimoles per 100 grams of monomer, is contacted with monomer under polymerization conditions, the polymerization temperature being in the range of —100° C. to 150° C., preferably —75 to 100° C. The pressure employed during polymerization need be only that necessary to maintain the reaction mixture substantially in the liquid phase.

When isoprene is polymerized in accordance with this invention, the polymer is obtained in a solution and can be treated with various reagents to produce functional groups by replacing the terminal lithium atoms on the polymer molecule. For example, polyisoprene in solution can be contacted first with carbon dioxide and then with an acid to replace the lithium atoms with a —COOH group. Other functional groups which can be introduced include —SH, —OH, and the like. Alternatively, the unquenched polymer solution can be treated with an alcohol or other reagent to inactivate the initiator and/or precipitate polymer which is then recovered without functional groups.

Polymers such as polyisoprene produced in accordance with this invention can be compounded in any conventional manner, utilizing vulcanizing agents, vulcanizing accelerators, accelerator activators, reinforcing agents, softeners, plasticizers, fillers and the like, and can be used for the manufacture of vehicle tires and in other applications for natural rubber.

EXAMPLE I

Polymerization initiators were prepared by reacting 1,3-dibromobenzene with variable amounts of n-butyllithium and elemental iodine. 3-bromophenyllithium was prepared by reacting 1,3-dibromobenzene and n-butyllithium (no iodine) and used as a control initiator. The recipes were as follows:

| Run | 1 | 2 | 3 | 4 |
| --- | --- | --- | --- | --- |
| Cyclohexane, ml | 80 | 80 | 80 | 80 |
| 1,3-dibromobenzene, mmoles | 10 | 10 | 10 | 10 |
| n-Butyllithium, mmoles | 15 | 17.5 | 20 | 10 |
| Iodine, mmoles | 2.5 | 3.75 | 5.0 | 0 |
| BuLi:$I_2$ mole ratio | 6:1 | 4.7:1 | 4:1 | ------- |
| Dibromobenzene:$I_2$ mole ratio | 4:1 | 2.7:1 | 2:1 | ------- |
| Temperature, °F | 122 | 122 | 122 | 122 |
| Time, hours | 2 | 2 | 2 | 2 |
| Molar alkalinity | 0.1 | 0.13 | 0.13 | 0.09 |

The reactions were conducted in an atmosphere of nitrogen. Iodine was charged first, and then the cyclohexane. This mixture was agitated at a temperature of 122° F. for one hour, after which the 1,3-dibromobenzene was added and then the butyllithium. The temperature was maintained at 122° F. for two more hours to allow time for the reaction. The molar alkalinity of each reaction mixture was determined by titration of a measured aliquot with 0.1 N HCl. The alkalinity was essentially that which was obtained by the reaction of each hydrolyzed polymerization initiator aliquot with the 0.1 N HCl titrant.

Each of the initiators was used in variable amounts for the polymerization of isoprene. The recipe was as follows:

| | |
| --- | --- |
| Isoprene, parts by weight | 100 |
| Cyclohexane, parts by weight | 1000 |
| Initiator, mhm.[1] | Variable |
| Temperature, °F. | 158 |
| Time, hours | 2 or 15 |

[1] Mhm. = gram millimoles per 100 grams monomer.

The cyclohexane was charged first, after which the reactor was purged with nitrogen, the monomer was introduced, and then the initiator. At the conclusion of each polymerization the reaction was shortstopped with approximately one part by weight per 100 parts by weight rubber of 2,2' - methylene-bis-(4-methyl-6-tert-butylphenol), employed as a 10 weight percent solution in isopropyl alcohol. The polymer was coagulated in isopropyl alcohol, separated, and dried in a vacuum oven. Results are presented in Table I.

TABLE I

| Run No. | Initiator From Run | Mhm. | Poly time, hrs. | Conv., percent | Microstructure, Percent Cis | Microstructure, Percent Trans | Inh. Visc. | Gel, percent |
| --- | --- | --- | --- | --- | --- | --- | --- | --- |
| 1 | 1 | 2.0 | 2 | 72 | 89 | 5.5 | 5.22 | 0 |
| 2 | 2 | 2.0 | 2 | 66 | 95 | 5.7 | 5.76 | 0 |
| 3 | 3 | 2.0 | 2 | 59 | | | | |
| 4 (control) | 4 | 3.0 | 2 | 59 | | | | |
| 5 | 1 | 1.75 | 15 | 97 | 93 | 5.7 | 5.04 | 0 |
| 6 | 1 | 2.5 | 15 | 94 | 90 | 5.8 | 3.92 | 0 |
| 7 | 2 | 1.75 | 15 | 96 | 95 | 6.2 | 5.45 | 0 |
| 8 | 2 | 2.5 | 15 | 96 | 92 | 5.2 | 4.54 | 0 |
| 9 | 3 | 1.75 | 15 | 94 | 92 | 5.6 | 4.98 | 0 |
| 10 | 3 | 2.5 | 15 | 94 | 89 | 5.5 | 4.02 | |

Microstructure, inherent viscosity, and gel data were not determined on the samples for which no values are given. The polymerization time for runs 1 through 4 was two hours. The data show that a 3 millimole initiator level was required in control run 4 to give a conversion as high as was obtained in run 3 made according to the invention. The polymerization time for runs 5 through 10 was 15 hours. High conversions were obtained in runs 5 through 10, made according to the invention.

Each of the initiators was used in variable amounts for the polymerization of isoprene. The recipe was the same as that given in Example I except for the polymerization time which was 18 hours. Data are presented in Table III.

TABLE III

| Run No. | Initiator | | Conv., percent | Microstructure, percent | | Inh. Visc. | Gel, percent |
|---|---|---|---|---|---|---|---|
| | From Run | mhm. | | Cis | Trans | | |
| 1 | 1 | 2.5 | 83 | 88 | 5.1 | 3.71 | 0 |
| 2 | 1 | 2.25 | 75 | 93 | 5.2 | 3.82 | 0 |
| 3 | 1 | 2.0 | 53 | | | | |
| 4 | 1 | 1.75 | 23 | | | | |
| 5 (control) | 2 | 2.5 | 19 | | | | |
| 6 (control) | 2 | 2.0 | Trace | | | | |

EXAMPLE II

Elemental bromine was employed instead of iodine for preparing polymerization initiators. The bromine was dissolved in cyclohexane to make a solution that was 0.185 molar. The recipes were as follows:

| Run | 1 | 2 | 3 | 4 |
|---|---|---|---|---|
| Cyclohexane, ml | 68.2 | 76.5 | 85.0 | 93.0 |
| 1,3-dibromobenzene, mmoles | 10 | 10 | 10 | 10 |
| n-Butyllithium, mmoles | 17.5 | 15 | 12.5 | 10 |
| Bromine, mmoles | 3.75 | 2.5 | 1.25 | 0 |
| BuLi:Br₂ mole ratio | 4.7:1 | 6:1 | 10:1 | |
| Dibromobenzene:Br₂ mole ratio | 2.7:1 | 4:1 | 8:1 | |
| Temperature, °F | 122 | 122 | 122 | 122 |
| Time, hours | 3 | 3 | 3 | 3 |
| Molar alkalinity | 0.11 | 0.11 | 0.08 | 0.10 |

The reactions were conducted in an atmosphere of nitrogen. Cyclohexane was charged first, then the dibromobenzene and the butyllithium. The bromine solution was added slowly to this mixture while it was agitated. The temperature was maintained at 122° F. for three hours. The molar alkalinity of each reaction mixture was determined by titration of a measured aliquot with 0.1 N HCl.

Each of the initiators was used in variable amounts for the polymerization of isoprene. The recipe was the same as that given in Example I except that the polymerization time was 18 hours. Results are presented in Table II.

TABLE II

| Run No. | Initiator | | Conv., percent | Microstructure, percent | | Inh. Visc. | Gel, percent |
|---|---|---|---|---|---|---|---|
| | From Run | mhm. | | Cis | Trans | | |
| 1 | 1 | 1.5 | 44 | | | | |
| 2 | 1 | 1.75 | 99 | 89 | 5.8 | 4.42 | 0 |
| 3 | 2 | 1.5 | 97 | 89 | 5.9 | 4.84 | 0 |
| 4 | 2 | 1.75 | 98 | | | | |
| 5 | 3 | 1.75 | 93 | 84 | 6.0 | 3.01 | 0 |
| 6 (control) | 4 | 1.5 | Trace | | | | |
| 7 (control) | 4 | 1.75 | Trace | | | | |

These data show that lower initiator levels can be employed to obtain higher conversions to polymer than can be used when the initiators are prepared in the conventional manner, i.e., without addition of elemental halogen.

EXAMPLE III

Iodine monochloride was employed instead of elemental halogen for preparing a polymerization initiator. The diluent was charged first, then the iodine monochloride, the 1,3-dibromobenzene, and the n-butyllithium. A control initiator was prepared without the iodine monochloride. The recipes were as follows:

| Run | 1 | 2 |
|---|---|---|
| Cyclohexane, ml | 80 | 80 |
| 1,3-dibromobenzene, mmoles | 10 | 10 |
| n-Butyllithium, mmoles | 15 | 10 |
| Iodine monochloride, mmoles | 2.5 | 0 |
| BuLi:ICl mole ratio | 6:1 | |
| Bromobenzene:ICl mole ratio | 4:1 | |
| Temperature, °F | 122 | 122 |
| Time, hours | 2 | 2 |
| Molar alkalinity | 0.11 | 0.09 |

These data show that iodine monochloride can be used instead of elemental halogen for the initiator preparation and that the initiator is effective at much lower levels for the polymerization of isoprene than the control initiator which was prepared in the absence of iodine monochloride.

EXAMPLE IV

An initiator was prepared by reaching 1,3-dibromobenzene, butyllithium, and elemental iodine in the presence of n-pentane as the diluent instead of cyclohexane. The recipe was as follows:

| | |
|---|---|
| n-Pentane, ml. | 80 |
| 1,3-dibromobenzene, mmoles | 10 |
| n-Butyllithium, mmoles | 20 |
| Iodine, mmoles | 5 |
| BuLi:I₂ mole ratio | 4:1 |
| Dibromobenzene:I₂ mole ratio | 2:1 |
| Temperature, °F. | 122 |
| Time, hours | 2 |
| Molar alkalinity | 0.12 |

This initiator and that prepared according to run 2 of Example I (cyclohexane used as diluent) were employed for the polymerization of isoprene. The recipes were as follows.

| Run | 1 | 2 |
|---|---|---|
| Initiator prepared in | Cyclohexane | n-Pentane |
| Cyclohexane, parts by weight | 1,000 | 1,000 |
| Isoprene, parts by weight | 100 | 100 |
| Initiator, mhm | 1.75 | 2.0 |
| Temperature, °F | 158 | 158 |
| Time, hours | 15 | 18 |

A series of runs was made using each initiator. The conversion for runs made according to recipe 1 ranged from 87 to 94 percent and the cis content ranged from 89 to 93 percent. The conversion for runs made according to recipe 2 ranged from 51 to 92 percent and the cis content ranged from 84 to 93 percent. Products prepared according to recipe 1 were blended to obtain a sample for evaluation. Inherent viscosity of the blend was 5.3. Likewise, products prepared according to recipe 2 were blended. Inherent viscosity of this blend was 4.2.

Each of the polymer blends was compounded in a tread stock recipe and also in a gum stock recipe, cured, and physical properties determined.

TABLE IV

| Run | 1 | 2 |
|---|---|---|
| *Tread stock recipe, parts by weight* | | |
| Polymer | 100 | 100 |
| High abrasion furnace black | 50 | 50 |
| Zinc oxide | 3 | 3 |
| Stearic acid | 3 | 3 |
| Flexamine (1) | 1 | 1 |
| Flexzone 3C (2) | 2 | 2 |
| Aromatic oil (Philrich 5) | 5 | 5 |
| Vultrol (3) | 1 | 1 |
| Sulfur | 2.25 | 2.25 |
| NOBS Special (4) | 0.65 | 0.65 |
| *Cured 30 minutes at 293° F.* | | |
| Compression set, percent | 21.0 | 21.5 |
| 300% Modulus, p.s.i. | 1,370 | 1,340 |
| Tensile, p.s.i. | 4,030 | 3,950 |
| Elongation, percent | 615 | 615 |
| Maximum tensile at 200°F., p.s.i. | 2,420 | 2,310 |
| ΔT, °F | 40.6 | 43 |
| Resilience, percent | 72.1 | 70.8 |
| Shore A hardness | 58 | 57.5 |
| *Gum stock recipe, parts by weight* | | |
| Polymer | 100 | 100 |
| Zinc oxide | 5 | 5 |
| Stearic acid | 3 | 3 |
| Sulfur | 2.7 | 2.7 |
| Santocure (5) | 0.8 | 0.8 |
| BLE 25 (6) | 1 | 1 |
| *Cured 30 minutes at 293° F.* | | |
| Tensile, p.s.i. | 4,150 | 4,200 |

(1) Physical mixture containing 65 percent of a complex diarylamine-ketone reaction product and 35 percent of N,N'-diphenyl-p-phenylenediamine.
(2) N-isopropyl-N'-phenyl-p-phenylenediamine.
(3) N-nitrosodiphenylamine.
(4) N-oxydiethylene-2-benzothiazolesulfenamide.
(5) N-cyclohexyl-2-benzothiazolesulfenamide.
(6) High temperature reaction product of diphenylamine and acetone.

The data show that the polyisoprene prepared using the initiators of this invention gave vulcanizates with excellent properties in both tread stock and gum stock recipes. The data also demonstrate that n-pentane can be employed as a diluent for preparing the initiators.

We claim:

1. A process for the polymerization of butadiene and/or isoprene monomers which consists of contacting at least one of said monomers with a haloaryllithium initiator at a temperature in the range of $-100°$ C. to $150°$ C., the amount of initiator present being less than 2.5 gram millimoles of haloaryllithium per 100 grams of monomer to be polymerized, a pressure sufficient to maintain the polymerization mixture substantially in the liquid phase, and in a hydrocarbon diluent selected from paraffins and cycloparaffins, said initiator consisting of haloaryllithium compounds having formulas (A) and (B) defined in the specification formed upon reacting (a) a dihaloaryl compound selected from 1,3-dihalobenzene and 1,3-dihalonaphthalene wherein the halogen substituent is selected from bromine, chlorine, and iodine, (b) an organolithium compound in the presence of (c) an elemental halogen or a mixed halogen compound again selected from chlorine, bromine, or iodine, and a hydrocarbon diluent selected from paraffins and cycloparaffins.

2. A process according to claim 1 for polymerization wherein said monomer is isoprene, said dihaloaryl compound is 1,3-dibromobenzene, said organolithium compound is n-butyllithium, said halogen is selected from elemental iodine, elemental bromine and iodine monochloride, and said hydrocarbon is selected from cyclohexane and n-pentane.

References Cited

UNITED STATES PATENTS

| | | | |
|---|---|---|---|
| 3,312,680 | 4/1967 | Kahle | 260—94.2 |
| 3,393,189 | 7/1968 | Trepka et al. | 260—94.2 |
| 3,429,829 | 2/1969 | Kahle | 252—431 |

OTHER REFERENCES

Copending application Ser. No. 634,454 applicants Trepka and Sonnenfeld.

JOSEPH L. SCHOFER, Primary Examiner

W. F. HAMROCK, Assistant Examiner

U.S. Cl. X.R.

252—431; 260—665